United States Patent
Shetrit et al.

(10) Patent No.: US 12,517,870 B1
(45) Date of Patent: Jan. 6, 2026

(54) MANAGING FILE SYSTEM ENTITY OPEN REQUESTS

(71) Applicant: VAST DATA LTD., Tel Aviv (IL)

(72) Inventors: Lior Shetrit, Tel Aviv (IL); Avi Goren, Tel Aviv (IL); Evgeny Katz, Tel Aviv (IL); Alon Berger, Tel Aviv (IL); Ilan Steinberg, Tel Aviv (IL); Lior Klipper, Tel Aviv (IL); Or Dahan, Tel Aviv (IL)

(73) Assignee: VAST DATA LTD., Tel Aviv (IL)

( * ) Notice: Subject to any disclaimer, the term of this patent is extended or adjusted under 35 U.S.C. 154(b) by 0 days.

(21) Appl. No.: 18/633,448

(22) Filed: Apr. 11, 2024

(51) Int. Cl.
G06F 16/18 (2019.01)
G06F 16/176 (2019.01)
G06F 16/182 (2019.01)

(52) U.S. Cl.
CPC ........ G06F 16/176 (2019.01); G06F 16/1824 (2019.01)

(58) Field of Classification Search
CPC .......................... G06F 16/176; G06F 16/1824
See application file for complete search history.

(56) References Cited

U.S. PATENT DOCUMENTS

| | | | | |
|---|---|---|---|---|
| 5,539,885 A | * | 7/1996 | Ono | G06F 9/4418 714/24 |
| 2005/0108237 A1 | * | 5/2005 | Sonoda | G06F 16/182 707/999.009 |

* cited by examiner

*Primary Examiner* — Loc Tran
(74) *Attorney, Agent, or Firm* — Reches Patents

(57) ABSTRACT

A method for managing file system entity (FSE) open requests in a shared namespace. According to an embodiment, the method includes (a) receiving, by a controller of a first storage system (FSS), a second storage system (SSS) transfer request for transferring to the SSS a responsibility to manage SSS given FSE open requests, the SSS given FSE open requests are generated by SSS users; (b) determining, by the controller of the FSS, whether to grant the SSS transfer request, wherein the determining is based on whether there is a current granted given FSE open request. When it is determined to grant the SSS transfer request the method includes (c) transferring the responsibility to manage the SSS given FSE related open requests to the SSS; and (d) updating, by the controller of the FSS, a FSS transfer data structure to reflect the transferring of the responsibility.

21 Claims, 3 Drawing Sheets

MANAGING FILE SYSTEM ENTITY OPEN REQUESTS

BACKGROUND

A global namespace describes a unified naming system for resources that can be accessed from multiple locations. A global file system is a distributed file system that can be accessed from multiple geographic locations, across a wide-area network, and enables concurrent access to a global namespace from anywhere.

A file access is usually preceded by a request to open the file for access. The response to the file open request is a file handle that is used by the user that sent the open request, to identify the file in subsequent access requests until the file is closed in response to requesting to close the file. The open request includes the filename, the user identifier and the desired access mode (e.g., read, write, append, read and write, etc.). Multiple concurrent open requests by multiple users can be granted if there are no conflicts among them. An open request is granted if the access mode indicated in the request does not violate access modes requested by other users to open the same file, and that were not yet terminated by using a close request.

An open/create request in SMB protocol includes an "access level" indicating the type of access intended to be performed by the user that requested to open the file, for example: read only, read/write, delete, directory-traverse, and further includes a "share level"—the type of access it allows to other entities requesting to open the file, as long as the file is opened to the user, for example: "non-write"- meaning that concurrent open requests are not to be allowed for entities that request an open for writing. The SMB server (or the storage system that acts as the SMB server), when receiving a new open/create request, needs to check whether the type of requested access and the requested share level will cause conflicts with other requests of current accessing entities.

When a file in a global filesystem is accessed by a remote user for reading or writing, not only the requested content of the file is transferred over the network, but also the communication related to the open request and the response to the open request, that adds to the read or write latency experienced by the remote user.

There is a growing need to reduce the latency.

SUMMARY

There may be provided a method for managing file system entity (FSE) open requests.

BRIEF DESCRIPTION OF THE DRAWINGS

The subject matter regarded as the embodiments of the disclosure is particularly pointed out and distinctly claimed in the concluding portion of the specification. The embodiments of the disclosure, however, both as to organization and method of operation, together with objects, features, and advantages thereof, may best be understood by reference to the following detailed description when read with the accompanying drawings in which:

DETAILED DESCRIPTION OF THE DRAWINGS

Figure 1:
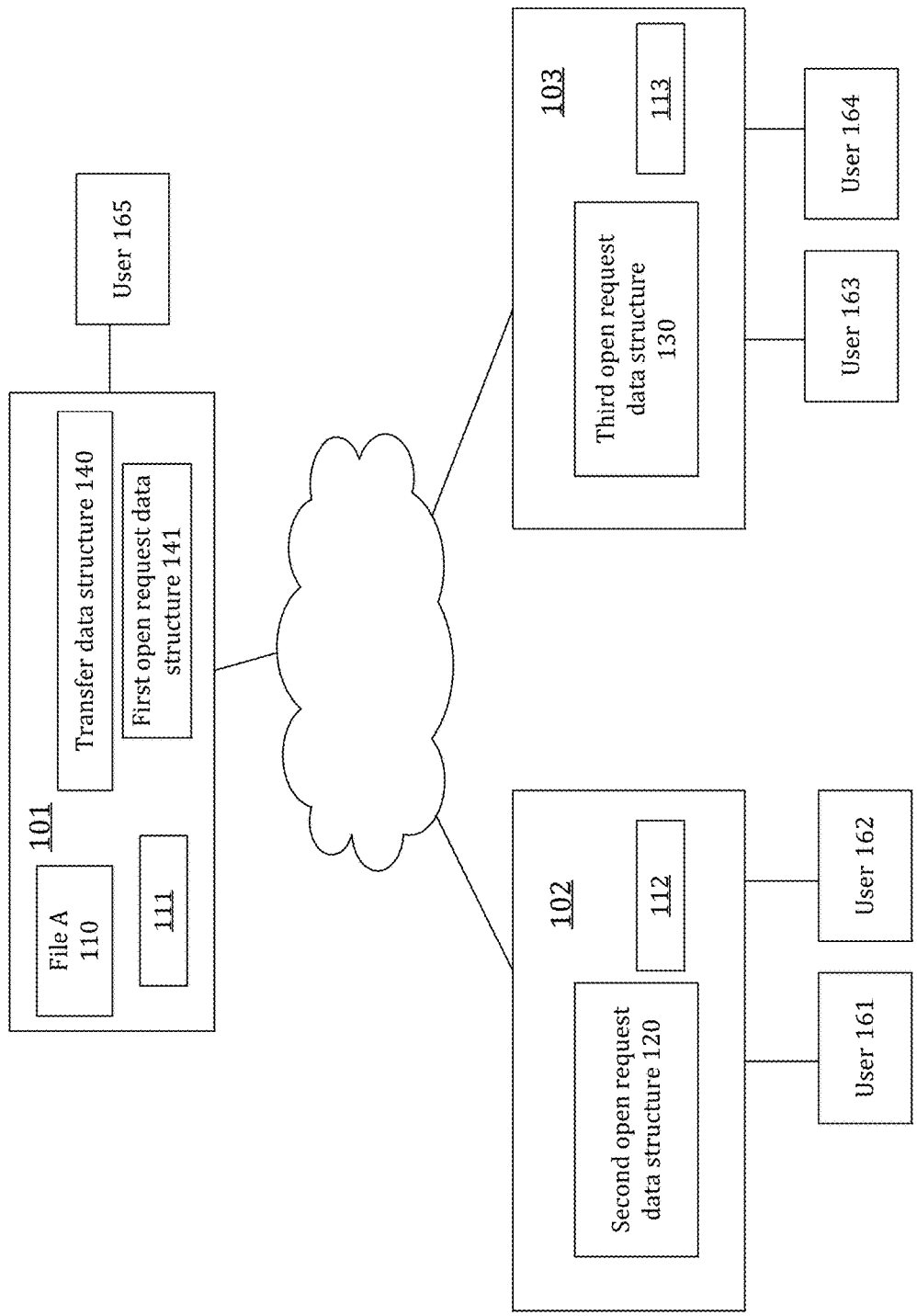
FIG. 1 is an example of storage systems.

A group of storage systems, located at different geographic locations, enables users, connected to different storage systems, to access and update global files or directories that are stored in any of the other storage systems (other than the storage system to which a user is connected to).

Specific filesystem entities (FSEs, e.g., file, directory) may be defined as globally accessible by different users connected to different storage systems across the group of storage systems, wherein the accessing users may be connected to storage systems that do not necessarily store the globally accessible FSEs.

For each globally accessible FSE, which can be accessed via multiple storage systems, one of the storage systems is considered as the owner of the FSE. This storage system usually stores the content (or most of the content) of the FSE, and additionally—manages open requests directed to the FSE. Usually, in order to manage open requests, the owner storage system may further store open information that includes: (i) FSE handles that were provided in response to open requests, (ii) the corresponding users that requested to open the FSEs (and still did not request to close the FSE), and (iii) the mode of requested access that was identified by the open requests.

Usually, when the owner storage system receives an open-request—it determines whether to allow access to the FSE based on the requested access mode and the stored open information (if exists) that includes the mode of accesses granted to all the current accessing users of the FSE. If no conflict is detected between the open request and the modes of current granted accesses of the FSE, as reflected by the open information—the open request is granted, and the FSE can be accessed by the user that sent the open-request.

Some applications that access the storage system send in addition to each access request, an open request that precedes the access request, and a close request that succeeds the access request. This sequence of requests are sent per each single access.

When such a sequence of requests (open, read/write, close) is performed by a user of a second storage system regarding a FSE that is stored at a first storage system at a remote location—a substantial part of the latency is wasted on the open and close requests, due to the transmission delay over the network that separates the two systems.

According to an embodiment of the invention, when the owner storage system of an FSE, e.g., the first storage system, receives an open request from another storage system, e.g., the second storage system—instead of responding to the open request (e.g., checking for conflicts, and providing a new handle), the first storage system replies with a permission to take the responsibility (by the second storage system) over the management of the open information of the FSE. Such a permission is provided when the first storage system detects that there are no current open requests for the requested FSE that are handled by the first storage system, e.g., there is no open information for the FSE that is stored at the first storage system.

Additional considerations to hand over the responsibility for the open information can be—if the first storage system detects that more than a certain number of open requests towards the FSE has been received from the second storage system, within a certain time window that preceded the reception of the current open request.

When the first storage system decides to hand over the responsibility for the open information, it initiates a data structure that includes open management information (also referred to as transfer data structure) of the FSE and includes the identity of the storage system that currently manages the open requests of the FSE, e.g., the second storage system, and the type of access that was requested in the open request.

For example, if the open request received from the second storage system indicated that the open request is for read-only, then the management record that is added will indicate that the management is for read-only.

After receiving the permission to manage the open information of the FSE, the second storage system initiates a data structure for storing the open information of the FSE in its local storage and updates the open information with information of the current open request and subsequent open requests received from the users of the second storage system and directed to that FSE, if these open requests are granted.

Any open request directed towards the FSE, that is received from now on by the second storage system from a user of the second storage system, is checked locally against the open information that is now stored at the second storage system. Read and write requests received by the second storage system from a user will be directed to the storage system that owns the content of the file, i.e., will be sent to the first storage system. Close requests will cause changing the locally stored open information, by removing the record related to the corresponding open request.

If the first (owner) storage system receives an open-request for the FSE from a third storage system or from users of the first storage system, and it detects (using the management information of the FSE and/or the lack of local open information) that the open information is not managed by the first storage system, but rather by another storage system, in this case—by the second storage system, the first storage system may request the second storage system to give up the responsibility for managing the open information of the FSE, and to send back the current open information (that is stored at the second storage system) to the first storage system, so that the first storage system regains the responsibility and will be able to handle the open request from the third storage system.

According to an embodiment, instead of requesting the second storage system to give up the responsibility, the first storage system may reply to the third storage system by sending another permission to take the responsibility over the management of the open information of the FSE, without requesting the second storage system to give up the responsibility. This kind of response can happen if the access mode indicated by the open request of the third storage system does not conflict with the access mode associated with the management that was granted to the second storage system. For example, non-conflicting access modes can be determined if the access mode indicated in the management information is read-only, and the access mode indicated in the open request of the third storage system is not associated with any writing (e.g., read-only, directory list, directory traverse, etc.).

FIG. 1 illustrates three storage systems—first storage system 101, second storage system 102 and third storage system 103. First storage system 101 hosts a global file A 110, and can receive open requests directed to global file A 110 that is stored in its storage devices. The open requests can be received from the user connected to first storage system 101, such as user 165, or from second storage system 102 that needs to serve open requests sent from user 161 and user 162, and third storage system 103 that needs to serve open requests received from users 163 and 164. Open request information regarding file A, if exists, is stored (in the first storage system 101) in first open request data structure 141.

Suppose First storage system 101 receives an open request for opening file A 110 from second storage system 102. Second storage system 102 sent the open request after it received a corresponding request from one of its users, e.g., user 161. First storage system checks whether there is an open information associated with file A 110 stored in its storage devices. Suppose, there is no open information associated with file A that is stored at first storage system 101, for example, when first open request data structure is empty (or does not exist).

Therefore, in response to the open request, first storage system 101 sends to second storage system 102 a message indicating that second storage system 102 can take the responsibility for managing the open information of file A 110. First storage system 101 initiates a transfer data structure 140 for storing the information that indicates that second storage system 102 was granted with the responsibility for managing the open information of file A 110, with access mode that matches the access mode that was requested by the open request. For example, if the open request indicated that read-only mode is requested, then the access mode that can be managed by second storage system 102 is also read-only mode.

After second storage system 102 has been granted with the responsibility for managing the open information of file A 110, it creates second open request data structure 120 for storing open information of file A in its storage devices. Then—it records the access granted from user 161 along with the access mode, and sends a response for the open request to user 161.

Subsequently, user 161 can send access requests directed to file A 110, e.g., a read request. Second storage system 102 checks that the type of the access request matches the access that is logged in the open information (stored in second open request data structure 120) for the open mode of user 161, and if so—redirect the access request to first storage system 101, where the FSE is stored.

Second storage system 102 may further receive close request and additional open requests from user 161 and from user 162. In response to the additional open requests, there is no need to send open requests to the first storage system 101, and instead, the second storage system 102 checks whether these additional open requests can be granted, based on its locally stored second open request data structure 120.

At some point, third storage system 103 may also send an open request addressing file A 110 to first storage system 101. First storage system 101 detects that it does not store open information for that file, and checks whether there is one or more other storage systems that manage the open information of file A. In this case, it checks the transfer data structure 140 for open management information of file A and finds that second storage system 102 was granted with the responsibility for managing the open information. If the access mode requested by the open request of third storage system 103 does not conflict with the access mode that is managed by second storage system 102—then first storage system 101 sends to third storage system 103 a message indicating that third storage system 103 can take the responsibility for managing the open information of file A 110, and further updates the transfer data structure 140 to indicate that the open request management was granted to third storage system 103. Third storage system 103 opens third open request data structure 130. From now on, both second storage system 102 and third storage system 103 can respond to their users' open requests toward file A 110, concurrently and independently (without forwarding the open requests to first storage system 101).

If the access mode requested by the open request of third storage system 103 conflicts with the access mode that is managed by second storage system 102 (for example, third storage system 103 requested a write mode)—then first storage system will send to second storage system 102 a message for revoking its management rights. In response to the revoking, second storage system 102 will send the current content of the second open request data structure 120 (at least the information related to the given FSE, file A) to the first storage system 101.

From now on—first storage system 101 is the manager of the open information of file A 110, and any open request received from second storage system 102 and/or third storage system 103—are responded with an approval or denial of the open request, rather than granting open management.

Each one of first, second and third storage systems include first, second and third controllers, respectively—such as first controller 111, second controller 112 and third controller 113.

According to an embodiment, a controller includes at least one processing circuitry that may include a central processing unit (CPU), and/or one or more other integrated circuits such as application-specific integrated circuits (ASICs), field programmable gate arrays (FPGAs), full-custom integrated circuits, etc., or a combination of such integrated circuits.

Figure 2:
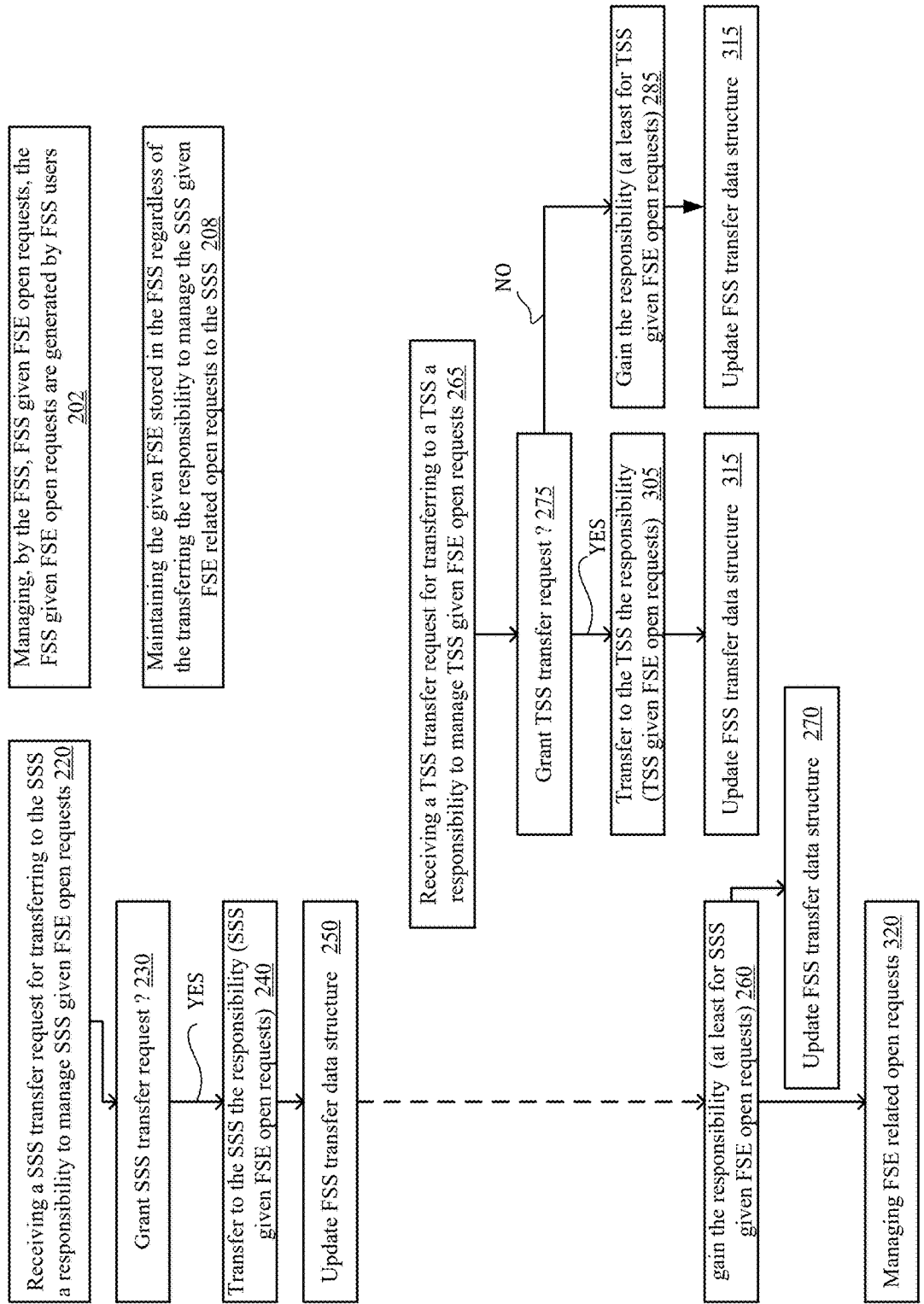
FIG. 2 is an example of a method.

FIG. 2 illustrates an example of method 200 for managing FSE open requests in a shared namespace.

According to an embodiment, method 200 includes step 220 of receiving, by a controller of the FSS, a second storage system (SSS) transfer request for transferring to the SSS a responsibility to manage SSS given FSE open requests, the SSS given FSE open requests are generated by SSS users and received by the SSS. An SSS user is a user that is connected to the SSS, and may be a server that is coupled to the SSS, an application running on that server, etc. The given FSE is a FSE that is under the responsibility of the FSS, and therefore may be initially managed by the FSS, and its content may be stored in the storage devices of the FSS. The SSS transfer request may be an explicit SSS transfer request that explicitly requests the transfer—or an implicit SSS transfer request. An example of an implicit SSS transfer request is a request from the SSS to open the given FSE to a user such an SSS user.

According to an embodiment, step 220 occurs while the given FSE is stored in the FSS and the FSS is the last storage system that managed given FSE open requests.

According to an embodiment, step 220 is followed by step 230 of determining, by the controller of the FSS, whether to grant the SSS transfer request. The determining of step 230 is based on whether there is a current granted given FSE open request. The current granted given FSE open request may include an open request granted to a user (of either the FSS or any other storage system) or a responsibility for handling open requests that was transferred to another storage system.

According to an embodiment, the SSS transfer request is an open request that is received from the SSS, and the FSS evaluates whether instead of treating it as an open request and responding as a regular open request (i.e., responding with a handle)—to treat it as a transfer request. The FSS may treat an open request as a transfer request when it detects that more than a certain number of open requests have been received from the SSS towards the given FSE, within a certain time window (e.g., within few second, few milliseconds, etc.) or it may treat any open request received from another storage system as a potential transfer request.

According to an embodiment, step 230 is followed by step 240, when it is determined to grant the SSS transfer request.

If it is determined not to grant the SSS transfer, the FSS may respond to an open request with granting (or rejecting) an open of the FSE, e.g., by sending a handle.

According to an embodiment, step 240 includes transferring the responsibility to manage the SSS given FSE related open requests to the SSS.

According to an embodiment, step 240 is followed by step 250 of updating, by the controller of the FSS, a FSS transfer data structure to reflect the transferring of the responsibility. The FSS transfer data structure may be updated that the SSS is the current manager of SSS given FSE related open requests, i.e., SSS can handle open requests directed to the given FSE and received from its users, without being dependent on the FSS, i.e., without sending a request to open to the FSS.

According to an embodiment, method 200 may also include, following the execution of steps 240 and 250, step 260 of regaining, by the FSS, the responsibility to manage the SSS given FSE related open requests.

According to an embodiment, step 260 is followed by step 320 of managing FSE related open requests regardless of an identity of a storage system associated with a user that generated the FSE related open requests. Thus—the FSS may manage given FSE open requests from the users of the FSS, from the users of the SSS or from users of any other storage system, when none of the other storage systems besides the FSS is responsible for managing open requests of its users.

According to an embodiment, step 260 is followed by step 270 of updating, by the controller of the FSS, the FSS transfer data structure to reflect the regaining of the responsibility. The update may include deleting the content of the FSS transfer data structure or even deleting the FSS transfer data structure, and may further includes initiating an open request data structure, such as open information 120, 130 of FIG. 1.

According to an embodiment, the regaining is triggered by at least one of the following events:
  a. A waiver of the SSS of the responsibility to manage the SSS given FSE related open requests. The SSS may issue the waiver, for example, when it detects that the given FSE is not opened by any user more than a certain time period.
  b. Receiving, by the controller of the FSS, a third storage system (TSS) transfer request for transferring a responsibility to manage TSS given FSE related open requests to the TSS, the TSS given FSE open requests are generated by TSS users.
  c. Receiving, by the controller of the FSS and from a FSS user, a request for opening the given FSE.

In another scenario, according to an embodiment and before regaining of the responsibility by the FSS, method 200 includes step 265 of receiving, by the controller of the FSS and while the SSS is responsible to manage the FSS given FSE related open requests, a third storage system (TSS) transfer request for transferring a responsibility to manage TSS given FSE related open requests to the TSS, the TSS given FSE open requests are generated by TSS users and received by the TSS. A TSS user is a user that is connected to the TSS. The given FSE is the same FSE which open requests are managed by the SSS.

According to an embodiment, step 265 is followed by step 275 of determining whether the TSS transfer request conflicts with the SSS transfer request.

According to an embodiment, step 275 is based on a SSS access request mode associated with the SSS transfer request and on a TSS access request mode associated with the TSS transfer request.

According to an embodiment, step 275 is followed by step 285 when it is determined that the TSS transfer request conflicts with the SSS transfer request.

According to an embodiment, step 285 includes regaining, by the FSS, the responsibility to manage the SSS given FSE related open requests. Step 285 includes sending to the SSS a request to revoke the responsibility to manage the SSS given FSE related open requests. After the regaining, the SSS will need to send open requests, issued by its users, to the FSS, and the FSS will response to the open requests without granting transfer of management to the SSS.

According to an embodiment, step 285 is followed by step 295 of updating, by the controller of the FSS, the FSS transfer data structure to reflect the regaining of the responsibility.

According to an embodiment, step 275 is followed by step 305 when it is determined that the TSS transfer request does not conflict with the SSS transfer request.

According to an embodiment, step 305 includes transferring the responsibility to manage the TSS given FSE related open requests to the TSS. The transfer does not change the responsibility of the SSS to continue managing SSS given FSE related open requests, and each of the TSS and the SSS can manage open requests issued by the users of each system.

According to an embodiment, step 305 is followed by step 315 of updating, by the controller of the FSS, a FSS transfer data structure to reflect the transferring of the responsibility to manage the TSS given FSE related open requests to the TSS. At this point, given that the SSS still maintains the responsibility to manage its users' open requests, the FSS transfer data structure includes records that describe the two transfers of responsibility (of the SSS and the TSS).

According to an embodiment, method 200 includes step 208 of maintaining the given FSE stored in the FSS regardless of the transferring the responsibility to manage the SSS given FSE related open requests to the SSS. Therefore, open requests received by the SSS from the SSS users, are handled locally by the SSS, while access requests related to the content of the FSE (data/metadata) are sent to the FSS, since it stores the content, and the FSS continues to respond to access requests towards the given FSE.

According to an embodiment, method 200 includes step 202 of managing, by the FSS, FSS given FSE open requests, the FSS given FSE open requests are generated by FSS users. The FSS manages FSS given FSE open requests when either: (i) no transfer of management is currently active, i.e., no other storage system manages open requests, (ii) when there is no conflict between the FSS given FSE open requests and currently active transfers.

Figure 3:
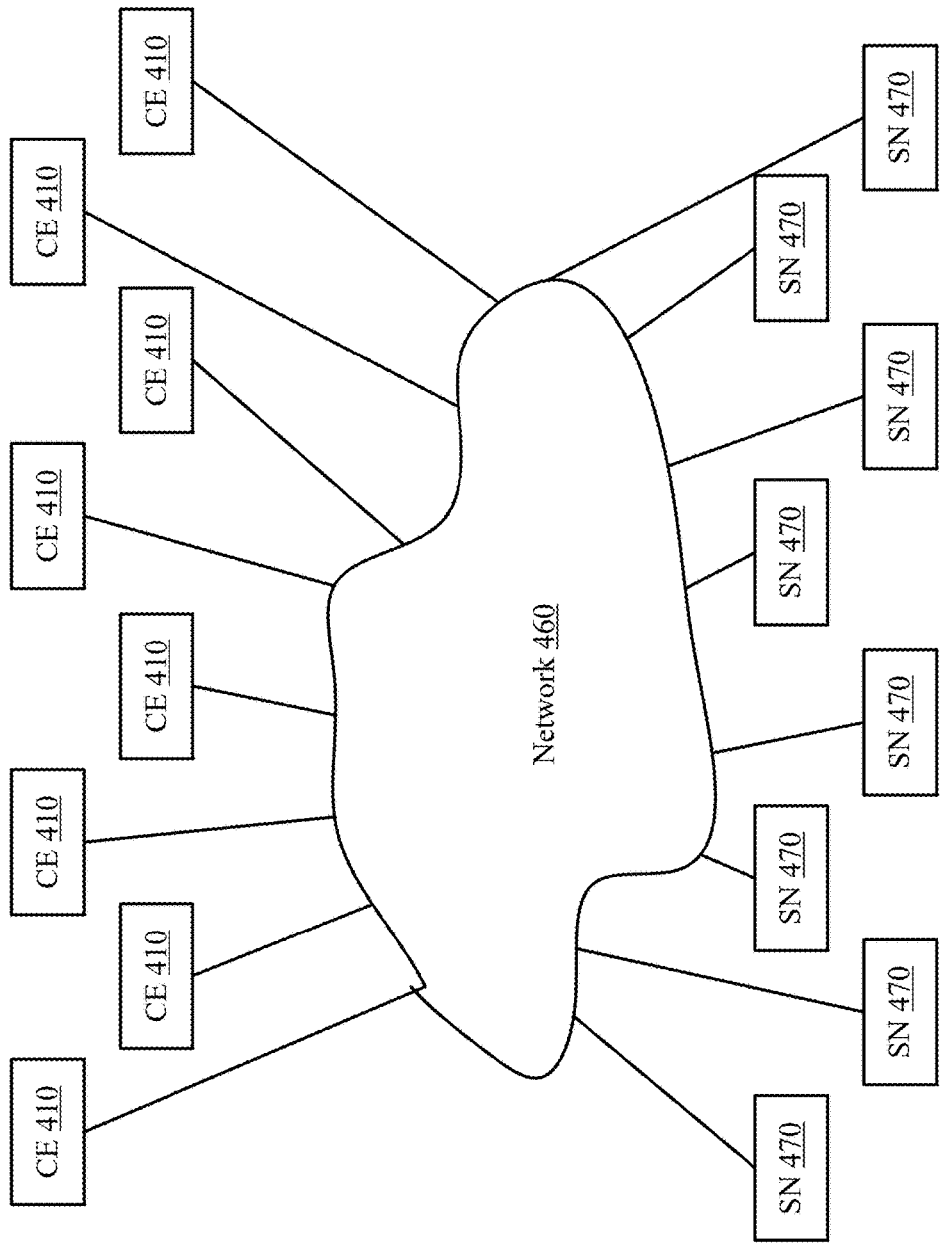
FIG. 3 illustrates an example of hardware components of a storage system.

FIG. 3 illustrates an example of storage system 400. This storage system may be either one of first, second and third storage systems of FIG. 1.

According to an embodiment, the storage system 400 includes compute entities (CEs) 410 and storage nodes 470. CEs 410 are arranged as multiple compute nodes that are in communication, via network 460 with the multiple storage nodes 470.

One or more CEs may include one or more controllers, may form the controller, may belong to a controller or may allocate at least part of their compute resources to operate as a controller. One or more of the multiple storage nodes include storage devices and may form a storage layer. The storage layer stores FSEs, transfer data structures and open requests data structures.

Any reference to "may be" should also refer to "may not be".

In the foregoing detailed description, numerous specific details are set forth in order to provide a thorough understanding of the one or more embodiments of the disclosure. However, it will be understood by those skilled in the art that the present one or more embodiments of the disclosure may be practiced without these specific details. In other instances, well-known methods, procedures, and components have not been described in detail so as not to obscure the present one or more embodiments of the disclosure.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the disclosure may for the most part, be implemented using electronic components and circuits known to those skilled in the art, details will not be explained in any greater extent than that considered necessary as illustrated above, for the understanding and appreciation of the underlying concepts of the present one or more embodiments of the disclosure and in order not to obfuscate or distract from the teachings of the present one or more embodiments of the disclosure.

Any reference in the specification to a method should be applied mutatis mutandis to a system capable of executing the method and should be applied mutatis mutandis to a non-transitory computer readable medium that stores instructions that once executed by a computer result in the execution of the method.

Any reference in the specification to a system and any other component should be applied mutatis mutandis to a method that may be executed by a system and should be applied mutatis mutandis to a non-transitory computer readable medium that stores instructions that may be executed by the system.

Any reference in the specification to a non-transitory computer readable medium should be applied mutatis mutandis to a system capable of executing the instructions stored in the non-transitory computer readable medium and should be applied mutatis mutandis to method that may be executed by a computer that reads the instructions stored in the non-transitory computer readable medium.

Any combination of any module or unit listed in any of the figures, any part of the specification and/or any claims may be provided. Especially any combination of any claimed feature may be provided.

In the foregoing specification, the invention has been described with reference to specific examples of embodiments of the invention. It will, however, be evident that various modifications and changes may be made therein without departing from the broader spirit and scope of the invention as set forth in the appended claims.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Any reference to "consisting", "having" and/or "including" should be applied mutatis mutandis to "consisting" and/or "consisting essentially of".

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

It is appreciated that various features of the embodiments of the disclosure which are, for clarity, described in the contexts of separate embodiments may also be provided in combination in a single embodiment. Conversely, various features of the embodiments of the disclosure which are, for brevity, described in the context of a single embodiment may also be provided separately or in any suitable sub-combination.

It will be appreciated by persons skilled in the art that the embodiments of the disclosure are not limited by what has been particularly shown and described hereinabove. Rather the scope of the embodiments of the disclosure is defined by the appended claims and equivalents thereof.

We claim:

1. A method for managing file system entity (FSE) open requests in a shared namespace, the method comprising:
    receiving, by a controller of a first storage system (FSS), a second storage system (SSS) transfer request for transferring to the SSS a responsibility to manage SSS given FSE open requests, the SSS given FSE open requests are generated by users of the SSS and directed to the SSS;
    determining, by the controller of the FSS, whether to grant the SSS transfer request, wherein the determining is based on whether there is a current granted given FSE open request that is managed by the FSS, and whether a responsibility to manage open requests towards the given FSE was already granted to another storage system that is different from the SSS;
    when it is determined to grant the SSS transfer request:
        transferring the responsibility to manage the SSS given FSE related open requests to the SSS; wherein the SSS given FSE open requests are responded by the SSS without an involvement of the FSS, only after the transferring of the responsibility; and
        updating, by the controller of the FSS, a FSS transfer data structure to reflect the transferring of the responsibility to the SSS, wherein the updating includes indicating an identity of the SSS.

2. The method according to claim 1, further comprising:
    regaining, by the FSS, the responsibility to manage the SSS given FSE related open requests; and
    updating, by the controller of the FSS, the FSS transfer data structure to reflect the regaining of the responsibility.

3. The method according to claim 2, wherein the regaining is triggered by a waiver of the SSS of the responsibility to manage the SSS given FSE related open requests.

4. The method according to claim 2, wherein the regaining is triggered by receiving, by the controller of the FSS, a third storage system (TSS) transfer request for transferring a responsibility to manage TSS given FSE related open requests to the TSS, the TSS given FSE open requests are generated by TSS users.

5. The method according to claim 2, wherein the regaining is triggered by receiving, by the controller of the FSS and from a FSS user, a request for opening the given FSE.

6. The method according to claim 1, further comprising receiving, by the controller of the FSS and while the SSS is responsible to manage the FSS given FSE related open requests, a third storage system (TSS) transfer request for transferring a responsibility to manage TSS given FSE related open requests to the TSS, the TSS given FSE open requests are generated by TSS users.

7. The method according to claim 6, determining whether the TSS transfer request conflicts with the SSS transfer request.

8. The method according to claim 7, wherein when it is determined that the TSS transfer request conflicts with the SSS transfer request then:
    regaining, by the FSS, the responsibility to manage the SSS given FSE related open requests; and updating, by the controller of the FSS, the FSS transfer data structure to reflect the regaining of the responsibility.

9. The method according to claim 7, wherein when it is determined that the TSS transfer request does not conflict with the SSS transfer request then:
transferring the responsibility to manage the TSS given FSE related open requests to the TSS; and
updating, by the controller of the FSS, a FSS transfer data structure to reflect the transferring of the responsibility to manage the TSS given FSE related open requests to the TSS.

10. The method according to claim 6, wherein the determining of whether the TSS transfer request conflicts with the SSS transfer request is based on a SSS access request mode associated with the SSS transfer request and on a TSS access request mode associated with the TSS transfer request.

11. The method according to claim 1, further comprising maintaining the given FSE stored in the FSS regardless of the transferring of the responsibility to manage the SSS given FSE related open requests to the SSS.

12. The method according to claim 1, further comprising managing, by the FSS, FSS given FSE open requests, the FSS given FSE open requests are generated by FSS users.

13. The method according to claim 1, further comprising regaining, by the FSS, the responsibility to manage the SSS given FSE related open requests; and managing FSE related open requests regardless an identity of a storage system associated with a user that generated the FSE related open requests.

14. A non-transitory computer readable medium for managing file system entity (FSE) open requests in a shared namespace, the non-transitory computer readable medium stores instructions for:
receiving, by a controller of a first storage system (FSS), a second storage system (SSS) transfer request for transferring to the SSS a responsibility to manage SSS given FSE open requests, the SSS given FSE open requests are generated by users of the SSS and directed to the SSS;
determining, by the controller of the FSS, whether to grant the SSS transfer request, wherein the determining is based on whether there is a current granted given FSE open request that is managed by the FSS, and whether a responsibility to manage open requests towards the given FSE was already granted to another storage system that is different from the SSS;
when it is determined to grant the SSS transfer request:
transferring the responsibility to manage the SSS given FSE related open requests to the SSS; wherein the SSS given FSE open requests are responded by the SSS without an involvement of the FSS, only after the transferring of the responsibility; and
updating, by the controller of the FSS, a FSS transfer data structure to reflect the transferring of the responsibility to the SSS, wherein the updating includes indicating an identity of the SSS.

15. The non-transitory computer readable medium according to claim 14, further comprising:
regaining, by the FSS, the responsibility to manage the SSS given FSE related open requests; and
updating, by the controller of the FSS, the FSS transfer data structure to reflect the regaining of the responsibility.

16. The non-transitory computer readable medium according to claim 15, wherein the regaining is triggered by receiving, by the controller of the FSS, a third storage system (TSS) transfer request for transferring a responsibility to manage TSS given FSE related open requests to the TSS, the TSS given FSE open requests are generated by TSS users.

17. The non-transitory computer readable medium according to claim 15, further comprising:
receiving, by the controller of the FSS and while the SSS is responsible to manage the FSS given FSE related open requests, a third storage system (TSS) transfer request for transferring a responsibility to manage TSS given FSE related open requests to the TSS, the TSS given FSE open requests are generated by TSS users; and
determining whether the TSS transfer request conflicts with the SSS transfer request.

18. The non-transitory computer readable medium according to claim 17, wherein when it is determined that the TSS transfer request conflicts with the SSS transfer request then:
regaining, by the FSS, the responsibility to manage the SSS given FSE related open requests; and
updating, by the controller of the FSS, the FSS transfer data structure to reflect the regaining of the responsibility.

19. The non-transitory computer readable medium according to claim 17, wherein when it is determined that the TSS transfer request does not conflict with the SSS transfer request then:
transferring the responsibility to manage the TSS given FSE related open requests to the TSS; and
updating, by the controller of the FSS, a FSS transfer data structure to reflect the transferring of the responsibility to manage the TSS given FSE related open requests to the TSS.

20. The non-transitory computer readable medium according to claim 14, further comprising maintaining the given FSE stored in the FSS regardless of the transferring the responsibility to manage the SSS given FSE related open requests to the SSS.

21. A first storage system (FSS), the first storage system comprises:
(i) a controller that comprises one or more integrated circuits, and (ii) storage devices configured to store a given file system entity (FSE);
wherein the controller is configured to:
receive, a second storage system (SSS) transfer request for transferring to the SSS a responsibility to manage SSS given FSE open requests, the SSS given FSE open requests are generated by users of the SSS and directed to the SSS;
determine whether to grant the SSS transfer request, wherein the determining is based on whether there is a current granted given FSE open request that is managed by the FSS, and whether a responsibility to manage open requests towards the given FSE was already granted to another storage system that is different from the SSS;
when it is determined to grant the SSS transfer request:
transfer the responsibility to manage the SSS given FSE related open requests to the SSS; wherein the SSS given FSE open requests are responded by the SSS without an involvement of the FSS, only after the transfer of the responsibility; and
update a FSS transfer data structure to reflect the transferring of the responsibility to the SSS, wherein the updating includes indicating an identity of the SSS.

* * * * *